United States Patent [19]

Kintigh et al.

[11] 4,117,392
[45] Sep. 26, 1978

[54] SCR CONTROLLER HAVING INPUT PULSES MECHANICALLY GENERATED BY A SIGNAL SOURCE

[75] Inventors: Stanley S. Kintigh, Minnetonka; Clarence D. Lilienthal, Eden Prairie, both of Minn.

[73] Assignee: Research Incorporated, Minneapolis, Minn.

[21] Appl. No.: 760,111

[22] Filed: Jan. 17, 1977

[51] Int. Cl.² .................. G05F 1/44; G05F 5/00
[52] U.S. Cl. .................. 323/21; 307/252 N; 323/22 SC; 323/34
[58] Field of Search .......... 323/19, 21, 22 SC, 34; 363/2; 318/313, 480; 307/252 H, 252 T, 252 UA, 354

[56] References Cited

U.S. PATENT DOCUMENTS

| | | | |
|---|---|---|---|
| 2,111,014 | 3/1938 | Vedder | 323/21 X |
| 3,624,486 | 11/1971 | Oates | 363/2 |
| 4,017,744 | 4/1977 | Johnson | 323/22 SC |

Primary Examiner—A. D. Pellinen
Attorney, Agent, or Firm—Kinney, Lange, Westman & Fairbairn

[57] ABSTRACT

A controller for controlling SCR's used for supplying power to loads, which provides digital control of the phase angle of the firing signal for SCR's during rapidly changing frequency of applied power. The digital control is based upon clocking signals which are derived directly from the rotation of a generator to always provide a set number of pulses for each electrical cycle independent of time (frequency).

7 Claims, 6 Drawing Figures

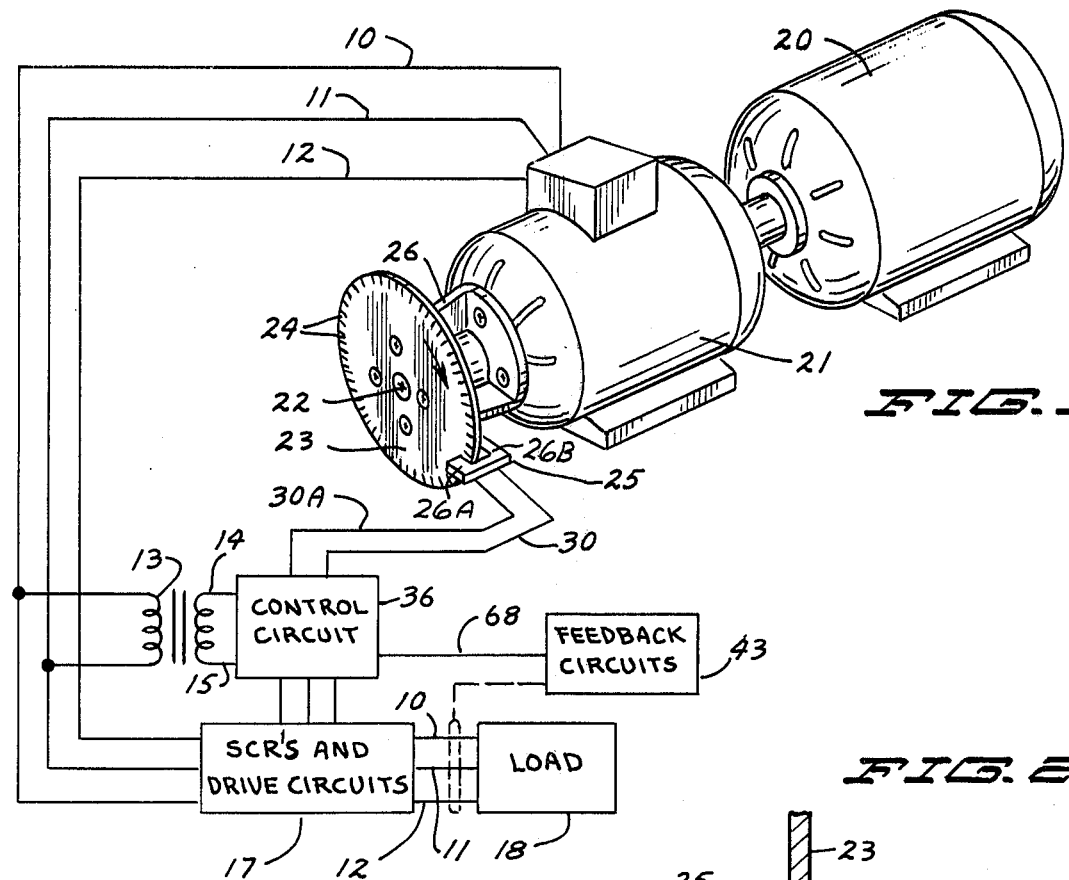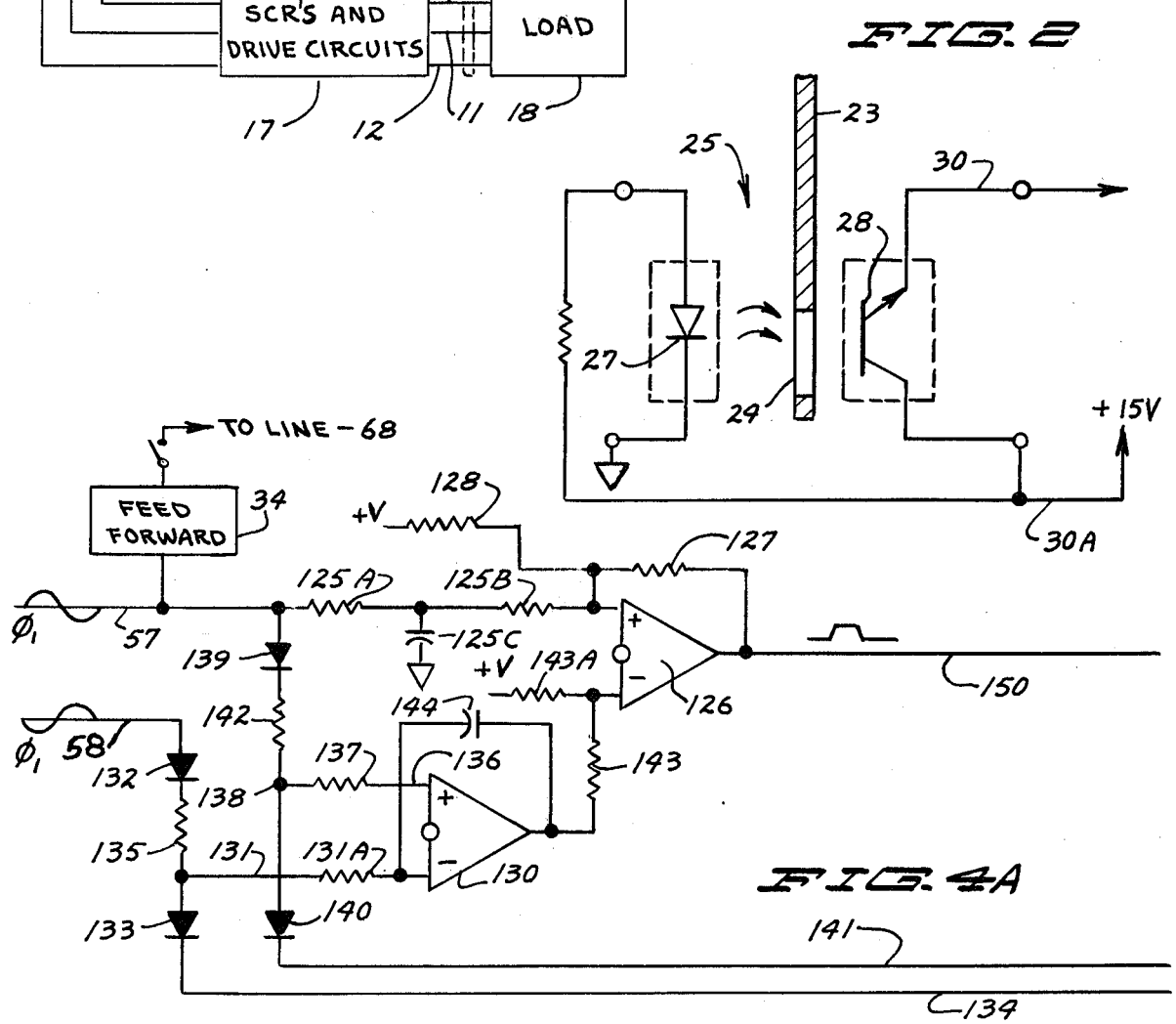

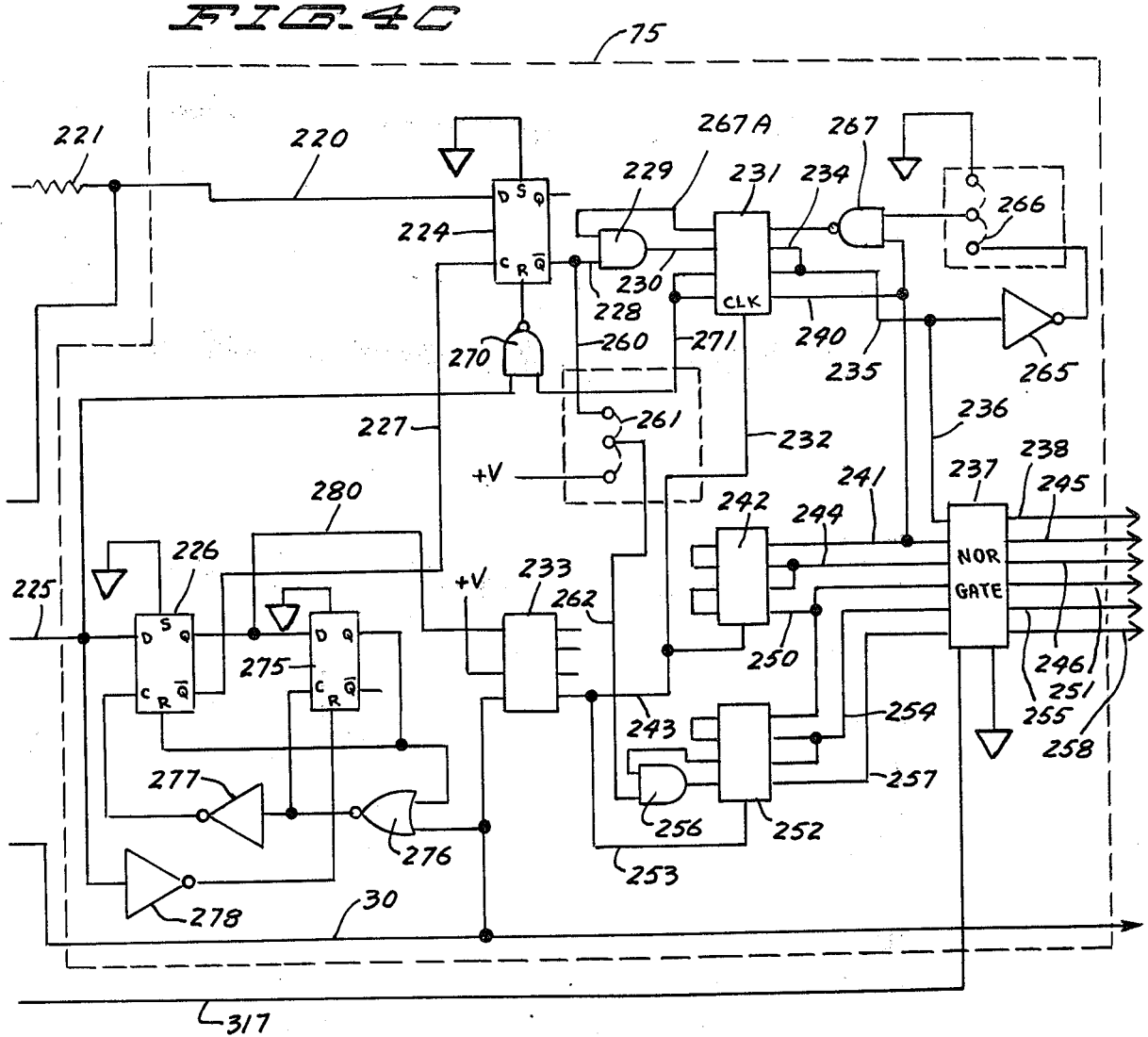
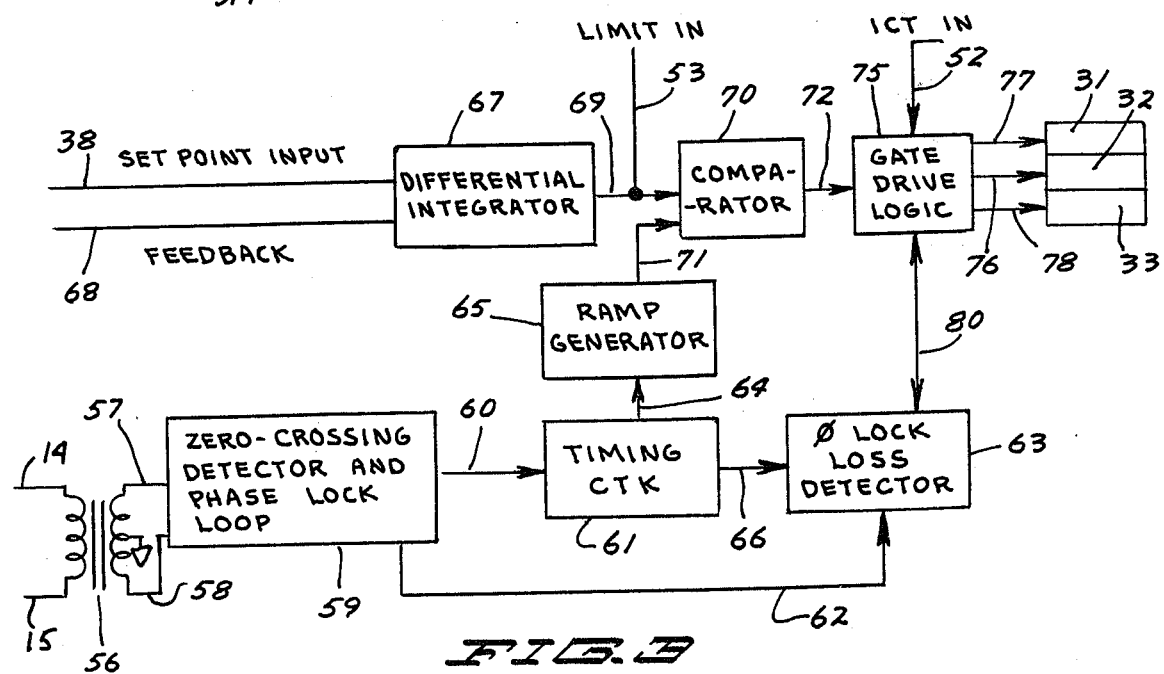

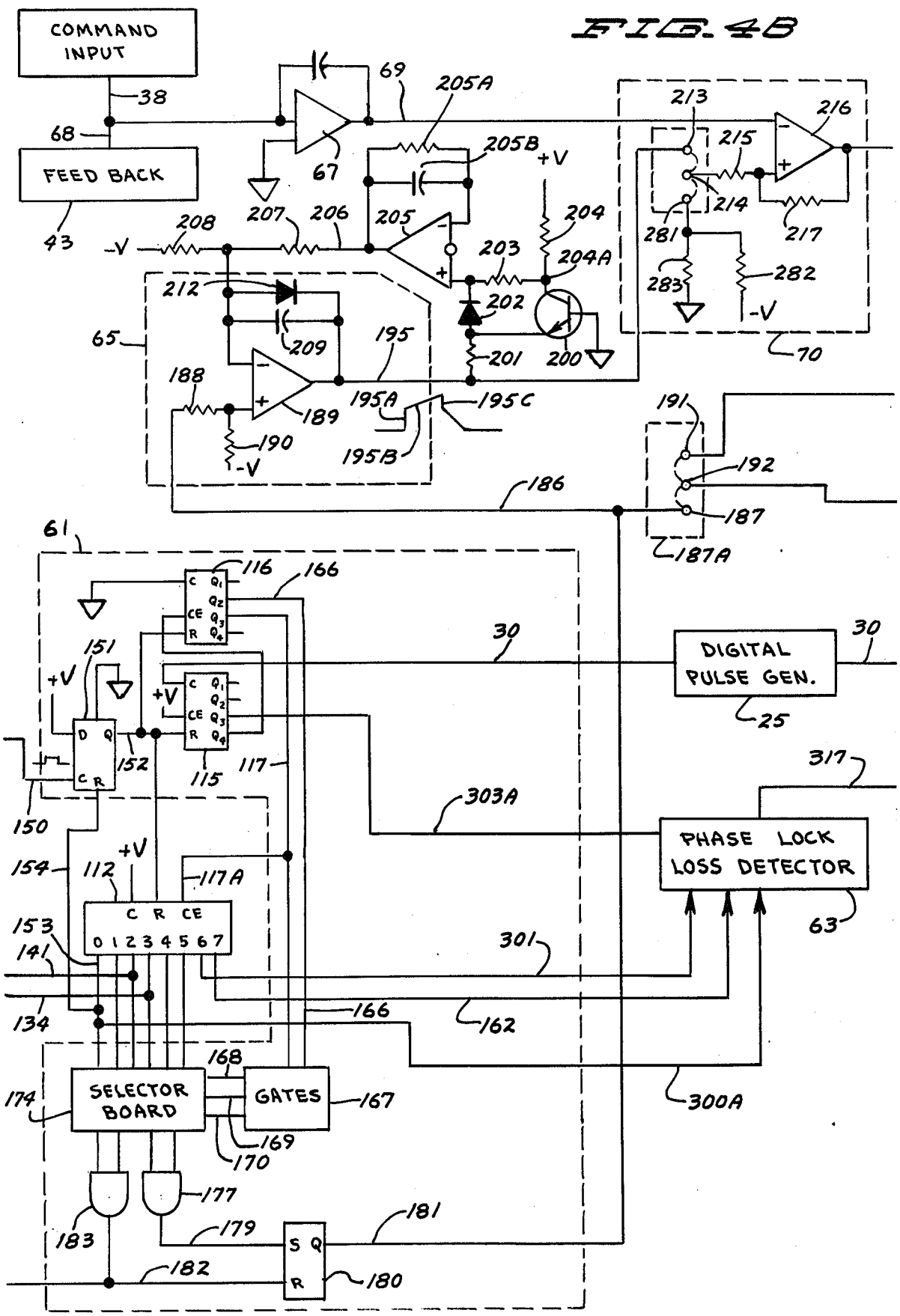

SCR CONTROLLER HAVING INPUT PULSES MECHANICALLY GENERATED BY A SIGNAL SOURCE

CROSS REFERENCE TO RELATED APPLICATION

The application incorporates herein substantial portions of the copending U.S. patent application of Clarence D. Lilienthal, Ser. No. 719,348, filed Aug. 31, 1976, and incorporates by reference the complete description thereof. Application Ser. No. 719,348 is assigned to the same assignee as this application.

BACKGROUND OF THE INVENTION

1. Field of the Invention

The present invention relates to power controllers utilizing SCR controls with widely varying frequency of the power source.

2. Prior Art

Various SCR (Silicon controlled rectifier) types of power controllers have been advanced. Silicon control rectifiers are three lead semi-conductor devices with large power handling capabilities. SCR's are commonly used to control single or three phase power for inductive or resistive loads. An SCR is capable of providing current flow in only one direction, and has only two stages or states, on (or conducting) and off (or not conducting). An SCR has an anode, a cathode and a gate, and is capable of conduction from the anode to the cathode, only after it has been turned on by application of a suitable signal to its gate. After turn on, it will turn off only when the current through it is reduced to a value below what is called the "holding current". Normally the threshold value of holding current is relatively low, and it can be assumed therefor that an SCR will cease to conduct whenever a sine wave being conducted passes through its zero point.

The prior art circuit shown in copending U.S. patent application Ser. No. 719,348, filed Aug. 31, 1976 is modified herein by substituting the clock utilized in application Ser. No. 719,348 with a pulse generator coupled to a generating means in a manner to deliver a set number of clocking pulses for each electrical cycle regardless of frequency of the generator output. The adjustable clock of application Ser. No. 719,348 provides adequate adjustment to be usable with different but relatively stable frequency signals are available.

The present device makes the controller device useful for controlling power in wide frequency variations.

SUMMARY OF THE INVENTION

The present invention relates to an SCR controller which provides the proper timing for triggering or firing SCR's. The controller of the present invention includes means to provide a precise number of digital pulses for each cycle of a periodic electrical signal. The pulses are used in a digital control system to provide a firing signal for SCR's independent of input signal frequency once a zero cross detector has provided a zero cross signal.

A digital tachometer provides input digital (pulse) signals which count an exact number for each period of a periodic electrical signal. There is a physical connection directly to the power generator rotating member and thus for each revolution (cycle) a set, known number of pulses will be provided during each cycle of the generated signal. The count is precise whether three phase (poly phase) or single phase signals are provided and regardless of the speed change of the shaft even during one electrical cycle.

In three phase power only one phase is used for zero cross detection and all SCR's used are synchronized to this one phase. It has been found in some inductive applications where high power is used turbines will drive generators at a relatively high rate of speed, and then power will be cut, and the speed of the rotation of the generator changes drastically. All during this time the power developed by the generator is being utilized through SCR's for example to power a large inductor for fusion experiments. It is of course required that the conduction angle of the SCR's be precise in this system, and with abrupt changes in frequency, even within a single cycle, without proper controls damage to the SCR's will result.

Copending U.S. application Ser. No. 719,348 provides a control system that determines the exact zero cross point of a periodic signal, and also a digitally controlled sequence of firing SCR's is illustrated. In that particular device the clock frequency was adjusted automatically and will accommodate a range of frequency changes. A set number of digital pulses (768) was provided from the clock during each cycle.

However, in installations where very rapid changes in frequency occur such as that described above, an oscillator clock itself cannot be compensated adequately, because the frequency is actually changing during each cycle. In the present application the zero cross detection of the input signal may be determined in exactly the same way as in said application Ser. No. 719,348 and the entire description is referred to and incorporated herein by reference to the extent necessary for an understanding of the present device.

Therefore, the present invention relates to the provision in a SCR controller circuit of a desired set number of digital pulses during each cycle of a periodic electrical signal being controlled regardless of the frequency of the signal, and regardless of large changes in frequency during each cycle.

The control unit is interlocked through the pulses from the pulse generator so that after the zero cross signal is received the phase angle of firing of the first SCR is precisely determined in relation to the zero cross signal and additional SCR's are fixed at precise phase angles in sequence subsequent to the first firing in each electrical cycle regardless of variations in frequency.

The logic level signals for firing the SCR are used through suitable driving circuits to provide sufficient, and properly shaped drive currents to the gate drives of the SCR's.

Suitable feedback devices can be used for sensing the voltage at the load, or optionally current sensing can be utilized to determine the current on the input side of the SCR's. Current limiting interlocks can be provided, and of course set point controls may be used for determining the desired level of power being supplied to a load.

A typical connection of six SCR's may be utilized as shown in U.S. application Ser. No. 719,348, and other standard SCR configurations also can be controlled. A logic circuit that provides six sequential pulses for powering SCR's is shown.

BRIEF DESCRIPTION OF THE DRAWINGS

FIG. 1 is a schematic representation of a typical installation using the SCR control of the present invention;

FIG. 2 is a representation of a typical pulse generator used to provide a set number of pulses for each cycle of the periodic signal generated with the apparatus shown in FIG. 1;

FIG. 3 is a block diagram of the control circuit depicted in FIG. 1; and

FIGS. 4A, 4B and 4C comprise a schematic representation of circuits used in the controls of the present device.

DESCRIPTION OF THE PREFERRED EMBODIMENT

Referring to FIGS. 1 and 2, three power lines 10, 11 and 12 carry three phase power. The signal in each line is 120° out of phase. Two of the lines 10 and 11 are tapped to a transformer 13 which provides input synchronization signals along lines 14 and 15 to a timing and control circuit 36. A motor 20 drives a generator 21 which provides the output signal along the lines 10, 11 and 12. The motor and generator are of conventional design, but in operation the motor is powered and then shut off so that the frequency of the periodic electrical signals along lines 10, 11 and 12 changes widely. For example, operation at frequencies varying from 65Hz to 15Hz has been experienced at slew rates on the order of 20Hz per second. Wider frequency changes also can be accommodated.

The power from lines 10, 11 and 12 are controlled by suitable SCR's which are represented schematically as the SCR and drive circuits 17. The load 18 is also shown schematically, and can be any desired load, as for example a large inductor load.

The frequency of the output of the generator 21 is dependent upon the speed of rotation of its drive shaft indicated at 22. In the form of the invention shown, the drive shaft 22 is directly connected to and driven by the drive shaft of motor 20. A disc or wheel 23 is drivably mounted on shaft 22. The disc is solid (opaque) except for a plurality of radial, annularly spaced apertures 24 defined therethrough adjacent its peripheral edge. An optical coupler indicated generally at 25 is mounted stationarily with respect to the generator housing on a support 26 and forms a digital tachometer or pulse generator in combination with wheel 23 and slots 24. An emitter diode 27 is mounted in one leg 26A of the support 26 and a photosensitive transistor 28 is mounted in another leg 26B of the support which is on the opposite side of the disc 23. The slots 24 permit light from diode 27 to strike photosensitive transistor 28 while the portions of the disc 23 between the slots blocks the light. When light is received by the photosensitive transistor the base conducts and a signal is transmitted along a line 30 from the emitter of transistor 28. The collector of the transistor 28 is connected through line 30A to a plus 15 volt source. The response time of the transistor is fast enough so that at the frequencies mentioned above a short pulse is provided on line 30 each time a slot 24 moves past the transistor 28. The diode and transistor assembly is a General Electric Company unit, part number H13A1.

The slotted disc and photo coupler shown therefore provides a set number of electrical pulses along the line 30 for each revolution of the disc 23 and shaft 22. The number of pulses is determined by the number of slots 24 in the disc which permit light to pass to the transistor 28. In the form shown 768 slots are provided in the wheel, and thus for each revolution of the shaft 22 the line 30 will carry 768 discrete voltage pulses regardless of the speed of rotation of the shaft. Therefore the number of pulses (768) will be the same for each cycle of the periodic signal generated by generator 21 completely independent of frequency. The mechanical connection of the disc to the generator shaft which also determines mechanically the frequency of the output current along the lines 10, 11 and 12 provides a precise digital representation of each cycle of the generated signal. The zero cross signal also can be obtained from the disc 23 by having an aperture at the proper location to provide a separate pulse at the start of each cycle.

The pulse train on line 30 is used in timing circuit for firing the SCR's being controlled. Once one of the SCR's is fired the use of the digital counter for each electrical cycle to drive digital firing controls will insure that all SCR's will be turned on at the proper phase angle. Each revolution of the shaft 22 of the generator is accurately represented by 768 pulses from the digital tachometer. The three phase timing circuit 36 also is connected to receive set point signals from a set point controller of conventional design. A circuit common is provided to the system for negative side reference, and a plus 15 volt power supply line is provided from a suitable power source. The pulse 15 volt connections are sometimes labeled "+V" for simplicity in the drawings (minus 15 volt sources are labeled −V). The circuit common connections are represented by open triangles.

The control and timing circuit can include an internal feed forward signal source circuit 34 (FIG. 4A) if desired for operation. The feed forward circuit provides a signal which is an estimate of the voltage at the output or load by sampling or sensing the input voltage. This feed forward signal may be used to supply a "feedback" signal function for comparison with any command signal for error signal control. The SCR control may also be provided as shown with a voltage feedback from the load lines or, also optionally, a current feedback control that senses the current in the input power lines (or output lines) can be provided to supply feedback. Voltage or current feedback circuits are represented at 43, and normally only one feedback (or internal feed forward) option would be used at a time. It should be noted that any controlled function can supply the feedback, including resistance levels, heat levels or the like. The feedback control circuit is indicated at 43 and its input is connected through a transformer of current sensor the load lines to provide a feedback signal proportional to the sensed parameter. The circuit 43 provides a feedback signal along the feedback line 68 to the control and timing circuit 36. Such feedback circuits are shown in U.S. application Ser. No. 719,348 and current sensors also can provide an instantaneous current trip signal alonng a line 52 (FIG. 3), which signal can be a shutdown or trip signal if the instantaneous current exceeds a selected amount. A sensed limiting signal may also be carried on line 53 which limits the value of any desired controlled parameter such as current, voltage, power or the like. These signals are safety shutdown signals and are used in many SCR controls.

BLOCK REPRESENTATION OF CONTROL AND TIMING CIRCUIT

Referring now to the schematic diagram of FIG. 3, a block representation of the three phase timing circuit 36 is shown. Input power from transformer 13 is supplied to a center tap transformer 56 along input lines 57 and 58 to a zero crossing detector and phase lock loop circuitry 59. The zero crossing detector provides an output along the line 60 to a timing circuit 61 when the AC input signal crosses zero at the start of each cycle. The zero cross signal is also provided along a line 62 to a phase lock loss detector circuitry 63. The timing circuit 61 provides an output timing signal at a selected time along the line 64 to a ramp generator 65 for phase fired control, or to logic circuitry for zero cross control. The timing circuit also provides a signal along the line 66 to the phase lock loss detector, so a determination can be made when the phase lock is lost to restart the system.

A command signal or set point input is provided along a line 38 to a first input of a differential integrator (amplifier) 67 and a suitable feedback or feed forward signal may be provided along the line 68 to the other input of the differential integrator 67. The feedback signal can comprise internal feed forward, voltage feedback or current feedback as previously mentioned.

The output of the differential integrator 67 is provided along a line 69 to one input of a comparator 70. The output of ramp generator 65 is provided to the other input of the comparator 70 along line 71. Additionally, line 69 is connected to the current limit line 53, which carries a current limiting signal that will override the output of the differential integrator when the sensed current has exceeded a desired level. The output signal of the comparator is provided along line 72 to logic circuits indicated generally at 75 that provide the gate drive signals along lines 76, 77 and 78, to SCR drive circuits shown schematically at 31, 32 and 33. The SCR drive circuits provide an output voltage sufficient to operate the SCR's being controlled and each circuit 31, 32 and 33 can drive two SCR's one of which may provide a return current path.

It should be noted that the lines 76, 77 and 78 are merely representative of connections that are made, and do not necessarily represent single lines leading to the circuits 31, 32 and 33.

The gate drive logic circuitry 75 also has an input connected to the instantaneous current trip line 52, which carries a signal to disable the gate drive circuitry in the event of excessive instantaneous current through the SCR's. A line 80 leads from the phase lock loss detector and provides a signal if something has gone amiss with the phase lock loop. Such a signal will disable the gate drive logic 75 and disable the SCR's to prevent damage to them.

TIMING AND CONTROL SCHEMATIC

Reference is now made to FIG. 4A, 4B and 4C which together represent a schematic diagram of the components comprising the timing and control circuit 36 (FIG. 1). The sheets of drawings bearing FIGS. 4A, 4B and 4C may be laid edge to edge so the entire circuit may be integrated as one for review. Included in the schematic representations in FIGS. 4A, 4B and 4C is an internal feed forward arrangement, feedback control and a typical input circuit are shown in application Ser. No. 719,348, which is an optional feature and other optional lines are also included. External feedback circuits will be described subsequently.

It is to be understood that the circuit shown in FIGS. 4A, 4B and 4C also include jumper connections that can be used to set the circuit for "phase fired" operation, or "zero cross" operation. To correlate FIGS. 4A, 4B and 4C with FIG. 3, dotted lines generally outline components which are represented by boxes in FIG. 3. The zero cross detector and phase lock loop circuitry 59 is primarily FIG. 4A and a small portion of FIG. 4B, the timing circuit 61 which is outlined primarily in FIG. 4B, adjacent the lower portion; the ramp generator 65 which is outlined near the top of FIG. 4B; phase lock loss detector 63 is represented as a box near the bottom of FIG. 4C; differential integrator 67 is represented near the top of FIG. 4A; the comparator 70 is outlined near the top of FIG. 4B; and the gate drive logic 75 is at the upper portions of FIG. 4C.

Line 57 is shown and carries "phase one" (between two of the three phase lines), and the line 58 will carry the inverse or complement of phase one. These periodic (sine wave) electrical signals and the relative phases thereof are represented on the lines 57 and 58 directly in FIG. 4A.

1. Input and Feedback

The set point (input) signals on line 38 can be from a potentiometer, a command voltage input, or a current input from a current source. A suitable resistor network may be used for providing the proper range signal for various current source inputs. The integrator may be a LM324N amplifier made by National Semi Conductor Corp., Santa Clara, Calif. The command input line 38 is connected to sum the feedback signal and then is connected to the negative input of the differential integrator amplifier.

2. Master Counter

Referring specifically to FIG. 4B, details of the timing circuit, which is important in determining the precise zero crossing point of the input signal on lines 58 and 59 is shown. Precise determination of zero cross is important in both phase fired and zero cross SCR control. The pulse generator described previously provides 768 counts or pulses along line 30 for each electrical cycle.

Clock pulses from line 30 are fed into a two section counter comprising counter sections 115 and 116, which counters are dual binary up counters made by Motorola, Inc., Phoenix, Arizona, their Model MC14520CP as shown. The terminals are the same on counters 115 and 116, and input pins are marked on 116 while output pins are marked on 115.

The binary counters 115 and 116 are arranged so that an output from counter 116 via line 117 will carry 6 pulses per electrical cycle. There will thus be six pulses provided via line 117A to a Johnson counter 118 for every electrical cycle of generator 21. The Johnson counter 118 is an octal counter/divider made by Motorola, Inc., their Model MC14022CP, and has decoded outputs. The zero through five outputs illustrated along the lower edge of counter 118 in FIG. 4B will each provide a 60° wide pulse sequentially each time a negative going pulse edge appears on line 117A which is connected to the "clock enable" pin. The clock pin of counter 118 is connected to a plus 15 volt source. The reset terminal (R) of counter 118 will receive a pulse at the detected zero cross point from zero cross detection circuitry 59, and thus a positive going pulse at the "zero" output of counter 118 starts at reset (zero cross) and lasts 60 electrical degrees; the "one" terminal output pulse commences at 60 electrical degrees into a cycle and continues until 120 degrees, when a pulse will appear at terminal "two" of counter 118. The output from terminal two will be high between 120 and 180 electrical degrees; the output from terminal three will be high between 180 and 240 electrical degrees; the output from terminal four being high between 240 and 300 electrical degrees, and the output from terminal five will be high between 300 and 360 electrical degrees. If a reset pulse has not been received by counter 118 from the zero cross circuitry by the time a 7th pulse is received from line 117A, a high output would appear on terminal six of counter 118 and if, sixty electrical degrees later, no reset pulse has yet been received a high output would be provided from terminal seven of counter 118.

There will be six 60 electrical degree pulses from counter 118 during an electrical cycle of generator 21. Also assuming that a zero cross signal resets the counter 118 at the proper time, the six, 60° pulses will repeat.

3. Zero Cross Detection

In FIG. 4A, it was previously pointed out that line 57 carries the phase one signal and line 58 carries the complement of the phase one signal from generator 21. Line 57, as shown, is connected through a filter arrangement indicated generally at 125 including resistors 125A and 125B and capacitor 125C to one input of a Norton amplifier 126 (National Semi Conductor Corp. Model LM3900N) which is hooked up as a comparator. The purpose of the comparator 126 is to convert the sine wave reference signal of phase one on line 57 into a square wave or pulse for each electrical cycle. A resistor 127 is connected to provide positive feedback for hysteresis, and another resistor 128 is connected to a 15 volt source to offset the sine wave input so that the 60 Hz output occurs at approximately the desired phase angle. The filter arrangement 125 provides a slight lag in the signal to the input of the comparator amplifier 126.

A Norton integrating amplifier 130, which is of the same general type as amplifier 126 (but connected as an integrator) has one of its inputs connected to a line 131, and through a suitable resistor 131A to a junction between a resistor 135 which is connected to the cathode of a diode 132 connected in line 58, and the anode of a diode 133, which are connected in series with line 57. The cathode of diode 133 is connected to a line 134 which in turn is connected to output three of the counter 118 shown in FIG. 4B, and previously discussed briefly.

The other (reference) input of the Norton integrator 130 is connected via a line 136 and a resistor 137 to a junction 138 between a resistor 142 and the anode of a diode 140. Resistor 142 is connected to the cathode of a diode 139 the anode of which is connected to line 57. A line 141 is connected to the cathode of diode 140 and to the number two output terminal of counter 118.

The output of integrator 130 is connected through a suitable resistor 143, to the input of comparator 126. It should be noted that a pulse reference voltage (15V) is also connected through a resistor 143A to this input of comparator 126. The output from integrator 130 provides a way of shifting the reference input to shift the phase angle of the output of the comparator 126 to insure that the positive going edge of the pulse from comparator 126 occurs at the time of the positive going zero cross of the reference sine wave. A capacitor 144 is connected between the output of the integrator 130 and the input of the comparator 126 to which line 131 is attached.

The output of the comparator 126 provides a square wave, as represented by the pulse immediately above the output line 150, and line 150, as shown, is also connected to the clock terminal of a dual type D flip-flop 151. The flip-flop 151 is made by Motorola, Inc., their number MC14013CP in the form disclosed. The clocking occurs with the positive going edge of the pulse on line 150, which will correspond to the positive going zero cross (0° or the start of each cycle) of the phase one signal on line 57. When flip-flop 151 is clocked, its output along line 152 resets counter 115 and 116, and also resets counter 118 to indicate that the positive going zero cross of the phase one sine wave has occurred. The positive going edge of the pulse from comparator 126 on line 150 defines the reference point or start of each cycle of electrical power being provided along line 57 and provides the zero cross signal. As soon as the counter 118 is cleared by the reset pulse, the pulse that is at the zero output of counter 118 in the drawings, which is provided along a line 153, goes positive, and this is connected through a line 154 to the reset terminal of flip-flop 151. Thus flip-flop 151 is reset shortly after it provides an output and the pulse on line 152 is very narrow.

Referring again to the integrating amplifier 130 (FIG. 4A), the diodes 133 and 140 form clamping diodes which enable the signals from lines 57 and 58 to be received by the respective inputs to the integrator 130 only during the portion of the cycle when the respective lines 134 and 141 are receiving pulses from counter 118. That is, an input along line 136 will be provided to integrator 130 only from 120 to 180 electrical degrees of each cycle, inasmuch as it is connected to the output terminal two of counter 118 through line 141 and the signal from line 58 will be provided to the other input of the integrator 130 only from 180 to 240 electrical degrees, that is, when, there is a pulse on line 134, which is connected to the No. three output of counter 118.

As previously explained, once the counter 118 is reset, it will receive one pulse (the negative edge of the pulse triggers the counter) at its clock enable input along line 117A for every 60 electrical degrees.

4. Zero Cross Phase Control

The integrator 130 then integrates the electrical signal of phase one immediately before the 180 electrical degree point (from 120 to 180 electrical degrees) which is just ahead of the zero cross in a negative going direction. The integrator also integrates the signal representing the complement of phase one immediately after the 180° zero cross (from 180 to 240 electrical degrees).

If the signals from the integration function of integrator 130 are now the same, the output of the integrator will not change. If however, the positive going edge of a pulse from the output of comparator 126 resets counter 118 too quickly, it would mean that it would be leading the actual zero cross at 180 electrical degrees and the integrated quantity of the phase one signal would be larger than the integrated quantity of complement of the phase one signal and the output of integrator 130 would integrate up, which will retard the phase angle of the start of the pulse output from comparator 126. The input current signal to comparator 126 at its positive terminal is offset from zero by filters 125B, 125C and 129 which forms a one pole filter of the input signal on line 57, and the offset current provided through resistor 128. The current to the negative input of comparator 126 is a reference current that is shifted by any unequal outputs of the two integrated quantities from integrator 130. The shift in reference current causes a change in the phase of the pulse from comparator 126. When the integrated quantities are equal the correct zero cross has been indicated. The zero cross detection circuit used in the present device may be any preferred type. The circuit disclosed is more fully explained in application Ser. No. 719,348. The pulse appears on line 150 when the positive going signal on the positive input of comparator 126 equals the reference current signal at its negative input.

5. SCR Firing Start And Stop Control

Referring again to the counter 116 an output line 166 is provided, and a 15° wide positive pulse appears on line 166 every 30 electrical degrees. These pulses are synchronized with the negative edge of pulses on line 117 (and 117A), which control the pulses from counter 118. Both of these lines are connected through suitable gates and inverters indicated only schematically at 167. The gates have outputs that are connected to a resistor board 174 to provide pulses which are 30° wide at 15°, 30° and 45° into each pulse from the counter 118. These are represented by lines 168, 169 and 170, respectively. The 0 through 5 outputs from counter 118 also are connected to board 174. The terminals on board 174 permit jumpering the terminals from the counter 118 and gates 167 to output terminals on board 174 leading to AND gates 117 and 183.

By properly jumpering the lines leading from the outputs of the counter 118 to one input of a "start" AND gate 177 and the other input to a desired one of lines 168, 169 or 170, a ramp start pulse can be provided from gate 177 at any 15° increment in the electrical cycle. Of course, both inputs of AND gate 177 may be connected to one of the outputs of counter 118 to provide a start pulse as soon as a pulse appears on that selected output (for example at zero cross).

A start pulse from gate 177 which appears on line 179 will set a flip-flop 180 which will provide an output pulse along an output line 181. The flip-flop 180 will not reset until a pulse appears along a reset line 182. It can be seen that this line 182 is connected to the output of an AND gate 183 which has its inputs on the selection board 174. The time of the ramp stop signal, or the pulse along line 181, can also be selected by jumpering the inputs of the gate 183 to selected terminals from the counter 118 and gates 167. The length of the pulse on line 181 (which continues until the flip-flop 180 is reset) can be selected to suit existing conditions.

6. Phase Fired SCR Initiation Signal Generation

The line 181, as shown is connected to a line 186 which has a jumper terminal 187 in a selection module 187A at one end, and which line is connected through a resistor 188 to one input of a ramp generator or integrator 189, which may be, for example an LM 324N op Amp made by National Semiconductor Corp., Santa Clara, Calif. This input (the pulse input) of the ramp generator is also connected to a minus 15 volt source through a resistor 190. Thus, when the output from flip-flop 180 goes high the pulse input of the ramp generator 189 goes from about minus ten volts provided through resistor 190 when no pulse is present on line 186 to minus five volts. The signal along line 181 is a pulse 15 volt logic level signal. The pulse input of ramp generator 189 will then be more positive than the minus input, and the output will be integrated positively. It should be noted that for the description that is to proceed, the unit is operating in a phase fired mode, and jumper terminals 191 and 192 in module 187A are connected together, and terminals 187 and 192 are not connected.

The ramp generator output signal or pulse will be generally along the form shown just below output line 195. The edge of an input pulse on line 186 will immediately raise the output signal on line 195 as shown at 195A, and the integration is represented by line 195B with the trailing edge 195C being when the pulse from flip-flop 180 is removed from line 181 by the reset signal along line 182. The time of reset can again be selected in the jumper mmodule 174 as previously explained.

If the peak voltage at the end of the ramp portion 195B exceeds more than minus 0.6 volts a transistor 200 will be turned off. It can be seen that the line 195 is connected through a resistor 201 to the emitter of transistor 200, and through a diode 202 and a resistor 203 to the collector of transistor 200, which in turn is connected through a resistor 204 to a plus 15 volt source. The base of transistor 200 is connected to digital common as shown. If the end of the ramp on line 195 goes more positive than about minus 0.6 volts and transistor 200 is turned off, the junction 204A will be permitted to go positive, which will cause integrator 205 to integrate positive. It can be noted that the junction 204A is connected to the positive input of integrator 205 (which is a Norton integrator LM3900N) through resistor 203 and the positive input of integrator 205 is also connected to line 195 through resistor 201 and diode 202. The negative input of the integrator 205 is connected through a parallel resistor-capacitor including resistor 205A and capacitor 205B to its output. The output line 206 of integrator 205 is connected through a resistor 207 to the negative input of the integrator 189, which terminal is also connected through a parallel diode 212 and capacitor 209 to line 195. A minus 15 volt source is connected through a resistor 208 to the negative input of ramp generator 189 at a junction between resistors 207 and 208.

Integrating positive by integrator 205 when transistor 200 turns off will raise the signal level on the minus input of ramp generator 189, and will lower the amplitude of the ramp from the output of ramp generator 189 on the next cycle. The positive integration will charge the capacitor 209 which is connected in a negative feedback arrangement.

It should be noted that the diode 202 is made so that it will not conduct unless the output along line 195 becomes more positive than about 1.2 volts. If the output of the ramp indicated along the line 195B becomes this positive, that is about plus 1.2 volts, diode 202 conducts to further cause the integrator 205 to integrate positive at a higher rate. This in turn will cause the output from integrator 189 in the next succeeding cycle to be lowered more rapidly. This feature is provided to insure that on start up the ramp indicated along line 195 will quickly get to approximately the right value for operation.

When the output of the flip-flop 180, which is the ramp control flip-flop, goes back to zero because of a reset or stop signal along line 182 that is selected to stop the ramping at the desired point of an electrical cycle, the positive input of integrator 189 goes back to minus 10 volts and the output along 195 step changes as indicated by the line 195C to about minus five volts. Then the signal integrates down quickly until the diode 212 conducts. The output along line 195 is then stabilized at the value of the voltage at the plus input to ramp generator or integrator 189 minus the voltage drop across the diode 212.

The length of the ramp signal represented by line 195B, forms a control range that provides the control of the number of degrees of conduction of the SCR's in phase fired configuration and this ramp length is determined by the length of the signal on lines 181 and 186. The ramp 195B starts and stops at the same voltage regardless of the length of time between lines 195A and 195B and thus the ramp slope will change in different firing modes. The rate of integration is thus varied in accordance with the line 181 signal but because the value always goes from about minus five volts to about zero volts the control action remains constant regardless of the frequency of the input signal or the SCR configuration.

The output pulse from ramp generator 189 is provided along line 195 to a jumper terminal 213 which can be connected in the phase fired mode to a jumper terminal 214 connected through a resistor 215 to an input of a comparator amplifier 216 which may be a National Semiconductor Corp. type LM324N and which forms the major component of the comparator block 70. The comparator 216 is connected to have some hysteresis determined by the resistor 215 and a feedback resistor 217.

The other input of comparator 216 is connected to the line 69 which carries the output from the error integrator 67.

The current limit line is connected to line 69 as well. It should be noted that the input to the integrator 67 is connected so that when a command input signal is calling for more power, the line 69 would be more negative.

The output pulse from the comparator 216 is delivered when the output of integrator 67 is more negative than the output of ramp generator 189. The farther that the output of integrator 67 goes negative, the sooner the output pulse from comparator 216 will be delivered after a pulse is provided on line 186. That is, looking at the ramp signal 195B, if the output from integrator 67 was more negative than the start of the ramp 195B, comparator 216 would provide a pulse at the time of signal 195A. If, however, the output from integrator 67 was more positive than the point where ramp 195 terminates at line 195C, the comparator 216 would provide no pulse during that cycle. Normally an output would be provided by the comparator 216 someplace between the start and finish of the ramp signal indicated by line 195B. That is, sometimes after the time of line 195A and before the time of line 195C.

7. SCR Control Logic

Comparator 216 provides the output pulse along a line 220, through a resistor 221 to the "D" input of a 4013 Dual Type D flip-flop 224, for example Motorola, Inc.'s Part MC14013CP. The output line from the comparator 216 is also connected through the jumper terminals 191 and 192 to a line 225 that leads to the D input of a type 4013 flip-flop 226. A clock pulse is generated along the line 227 from the Q not (inverting) output of the flip-flop 226 when a pulse is received from line 225. Flip-flop 224, when clocked by line 227 will provide a low output along the line 228 connected to an AND gate 229 which provides a low output along a line 230 to one input of a shift register 231 which may be a Motorola, Inc. Part No. MC14006CP. The shift register 231 is clocked from a clock line 232 that is conneted through a divider 223 to the clock line 30. The output pulses on line 232 are the clock pulses divided by 16, or 48 pulses per electrical cycle. Four clock pulses on line 232 will cause the low output from line 230 on shift register 231 to be provided at line 234. Line 234 is connected to a line 235 and a line 236 to a NOR gate buffer 237 such as Motorola, inc.'s No. MC14502CP. The NOR gate buffer inverts the low input signals as from line 236 and provides high output signals, as to corresponding control line 238, as long as there is no blocking high signal from line 317, which is connected to a blocking input of the buffer. The signal along line 238 is an output signal to an SCR drive circuitry, for example drive circuitry 31 see FIG. 3.

Eight line 232 clock cycles (60 electrical degrees of the input signal subsequent to this, the low input will appear on line 240 of shift register 231, which goes to the second input of the NOR gate buffer 237 along the line 241. The signal along line 241 is also provided to an input of a shift register 242 which is of the same type as shift register 231, which has its clock terminal connected to line 232 through a line 243.

When the low signal appears on line 241, a high output control signal will appear on line 245 of buffer 237. Line 245 may lead to SCR drive circuitry 32, and the logic level signal will initiate the drive with the proper SCR at the proper phase because of the mechanical drive for the clock pulses on line 30.

Shift register 242 is being clocked through line 243, and eight clock pulses after the low signal appears on line 241 the low signal will be provided along the line 244 to the NOR gate buffer 237 and a high signal on output line 246 provides the logic level signal to SCR drive circuitry 33. The signal on line 244 is fed back into the shift register 242, and eight clock cycles later the low signal will appear on line 250 which is connected to the fourth input of a NOR gate buffer 237 to provide an output signal along the line 251 to a second lead leading to the SCR drive circuitry 31 (for a 6 SCR) set up. This signal on line 250 is also provided to a shift register 252 that is of the same type as 231 and 242 and commonly clocked along the line 253 from line 232, so that eight clock cycles later the low output will appear on the line 254 leading to the NOR gate buffer 237 so that an output is provided along the line 255 to the SCR drive circuitry 32. This signal on line 254 is fed back into the shift register 253, as shown with the tie line, and through an AND gate 256 so that eight clock cycles later the shift register 252 will provide an output signal along line 257 leading to the NOR gate buffer 237 and provide an output along a final or sixth control line to 258 leading to SCR drive circuitry 33.

When there are six SCR's in line, it is known that two SCR's have to be on at the same time in order to provide a return path for current. Thus, when the first low or fire signal appears on line 228 from the output of flip-flop 224, this signal is carried by a line 260 across a jumper connection 261 (for any six SCR in-line configuration) to a line 262 leading to the other input of AND gate 256. The AND gate 256 will provide a low output or signal along the line 256, therefore, simultaneously with the appearance of the fire signal along lines 234, 235 and 236 so that fire signals will be appearing on lines 238 and 258 at the same time when the firing sequence initially begins.

Also, when six SCR's in line are being used as illustrated in application Ser. No. 719,348, when the low signal appears on line 235, it will pass through an inverter 265 across the phase fire jumper connection 266 to one input of a NAND gate 267, and provide a low level signal back to the shift register 231. Four clock pulses on line 232 or 30 electrical degrees of the input signal later, this low level signal will appear on line 267A and through AND gate 229 to line 230. As stated this low level signal is provided to the output 234 another 30 electrical degrees (four clock cycles of line 232) later so that a second fire signal will be provided on the output 238, and to each succeeding output line 60 electrical degrees after the first fire signal of a cycle so that two SCR's will be on at any given time to provide a path through one SCR, through the load and then back through another SCR. The repeat pulse is also used with a two leg SCR configuration. In other configurations, the jumper connections 266 may be disconnected and the input to AND gate 267 connected to ground. Likewise, the jumper connection 261 can be disconnected and a jumper connection connected to a plus 15 volt input for providing one input to the AND gate 256 which would effectively block any repeat fire pulses from being passed through the logic and provide for individual firing control.

A NAND gate 270 is connected to the reset terminal of flip-flop 224, and one input is connected to line 225 as shown, and the other input is connected through a line 271 to the pin of shift register 231 that goes low 60 electrical degrees from the provision of the initial low signal to the flip-flop 231 along line 230. The use of the NAND gate 270 means that where the repeat pulse is provided on line 230, there will be a gate pulse of the same width as the initial pulse (up to 60° wide) repeated after the first 60°. If the conduction angle is more than 60° the gate pulse will be 60° wide, and repeated, or in other words 120° wide. At conduction angles less than 60° the first pulse would end before the repeat pulse started. For example, with a conduction angle of 30° the pulse would be 30°. Then there would be no pulse for 30° and then the 30+ pulse would repeat. In other configuration, other than the six in-line SCR's or two leg configuration, up to a 60° wide gate pulse from flip-flop 224 is provided and no repeat signal is given because jumper 266 is removed. The signal along line 225 to NAND gate 270 will cause a reset signal to the first flip-flop 224 after the end of the ramp period, when the comparator signal pulse on line 220 ends. This arrangement prevents the SCR's from being gated on after they are reversed bias for less than 60° conduction angles.

A flip-flop 275 of the same configuration as flip-flops 224 and 26 has its D input connected to the noninverted output of flip-flop 226. The noninverted output of 275 is connected to the reset terminal of flip-flop 226. A NOR gate 276 has one input connected to the output of flip-flop 275 that has its other input connected to the clock line 114. NOR gate 276 drives inverter 277 which is connected to the clock terminal of flip-flop 226. Also, the output of NOR gate 276 is connected to the clock input of flip-flop 275. It should be noted that an inverter 278 is connected to the reset terminal of flip-flop 275 and the input of the inverter 278 is connected to line 225. This arrangement is made to insure that when the pulse along line 225 is received by flip-flop 226 and it goes positive, only a single clock pulse will appear on line 227 when the D input of 226 goes high.

8. Zero Crossover Fire Control

When operating under zero cross control, the jumper terminals 191 and 192 (FIG. 4B) will be disconnected and terminals 187 and 192 will be connected; and jumper terminal 214 (at the input of comparator 216) will be connected to a jumper terminal 281 that connects a fixed reference determined by resistors 282 and 283, respectively, to the positive input terminal of comparator 216. Thus, the error signal along line 69 is compared to this fixed reference, and an output pulse will be provided from the comparator 216 whenever the line 69 is more negative than the reference signal supplied through jumper terminal 281. When jumper pins 192 and 187 are connected, the line 225 will have a high signal whenever the line 181 from flip-flop 180 provides a high signal, and this will provide the clock pulse from flip-flop 226 independently of an output from the comparator 216. The output from the flip-flop 226 will then be synchronized with the pulse train signal and with the counter 118 and will be provided at zero cross time of each electrical cycle as indicated by the pulse on line 181 and selected in module 174. The fire flip-flop 224 will determine whether or not a fire signal is provide in exactly the same way as explained in connection with the phase fired circuitry depending on whether or not the output from comparator 216 is high or low when the clock pulse along line 227 is received by the flip-flop 224. If the output from the comparator 216 is high when the clock pulse along line 227 is received by flip-flop 224, the signal on line 69 is more negative than the reference at terminal 281, and a low output signal will appear on line 228. This will initiate the fire sequence as previously described to fire the SCR's through the logic circuitry. The high output line from flip-flop 226 is connected to the reset pin of shift register 233 which operates as a divider, and the divider 233 is cleared at the same time that the fire flip-flop 224 is set into a fire condition. This insures that the gate drive pulses that are propagating down the shift registers do not "jitter" from one cycle to another. Internal feedback will normally be used for zero cross control.

9. Phase Lock Loss Detection

The phase lock loop loss detection circuitry, and system start up circuitry is shown in application Ser. No. 719,348 and is represented only schematically. The output pulse from the sixth output of counter 118 is provided along a line 301 to the circuit. This pulse would appear if counter 118 was not reset by the zero cross detection pulse from comparator 126 before the counter was triggered by line 117A by a seventh negative pulse. This initiates a timer which is normally reset by a pulse along line 300A at the start of each cycle when the zero output of counter 118 goes high before its time period expires.

If the output pulse at terminal six of counter 118 is too long or if an output pulse appears on the seventh output the circuitry 63 will provide a high signal on line 317 which blocks passage of signals through NOR gate buffer 237 and will provide a shutdown signal for the circuit.

The phase lock loss detector circuitry may be designed to automatically restart the timing circuit if desired. The zero cross detection counting circuits, ramp generator and digital sequencing of the fire control are all the same as in application Ser. No. 719,348, except capacitor 144 may be made smaller for quicker integration by integrator 130 and as disclosed in an example of digital control means for SCR firings and with the pulse generator shown the firing sequence is directly related to phase angle and independent of frequency of the controlled power.

Mechanical or physical coupling of a pulse generator to the generating element to provide a known number of pulses for each revolution of the generator, or in other words for each electrical cycle, permits the precise phase angle sequencing of the SCR's. Also, because the ramp generator signal is digitally based from counter 118, the initial fire signal is at the proper phase angle independent of frequency.

The adjustment of the phase of the zero cross signal from comparator 126 from one cycle to the next through the integrator 130 makes adjustments that provide a sufficiently accurate initiating signal for widely varying frequencies. The digital control subsequent to the initiating signal insures proper phase angle signals because the pulse generator (digital tachometer) is directly coupled to the generator 21.

The zero cross signal or pulse may be provided mechanically without the circuitry shown in FIG. 4A if desired by providing a hole in disc 23 at the proper location apart from slots 24.

The hole, or other means on disc 23 used for generating a pulse on line 150 would be mechanically located at the desired angular relationship to the elements of the generator 21 to precisely signal the start of each electrical cycle.

If a separate hole was provided in disc 23 a separate optical sensor, such as that shown in FIG. 2 would be provided and the output would be connected to line 150.

The pulse generator used does not have to be optical, but could be magnetic or any other desired type.

What is claimed is:

1. A controller for controlling the gating of SCR's for providing output power from a periodic input signal generated by a mechanical signal generating means including means mechanically coupled to sense the phase of the input alternating signal to provide a first signal at a desired phase angle of said input signal, resettable counter means, means responsive to said first signal to reset said counter means, pulse generating means mechanically coupled to the signal generating means to provide a desired set number of clock pluses for each period of said input signal, means connecting said counter means to said pulse generating means, said counter means providing a plurality of counter output signals during each cycle of said input alternating signal subsequent to said first signal, means responsive to the output of said counter means to provide an initiating signal to drive SCR's at a desired phase relationship to the first signal, and digital sequencing means coupled to said means responsive and to said pulse generating means to provide a desired number of signals for control of SCR's precisely related to said initiating signal by the pulse generating means.

2. The combination as specified in claim 1 wherein said means responsive includes a ramp generator connected to said counter means and generating a signal increasing with time upon receipt of a counter output based signal, a comparator, means providing a control signal, said comparator being connected to compare the control signal and the signal from said ramp generator to deliver an output signal to said digital sequencing means when the ramp generator signal and the control signal are at a desired relationship.

3. The combination as specified in claim 1 wherein said digital sequencing means includes shift register means coupled to be clocked as a direct function of said pulse generating means.

4. Control circuitry for driving a plurality of SCR's for controlling power from an alternating input signal generated from a rotating shaft generator to an output load including means to determine when the input signal is at a desired phase angle, means coupled to said rotating shaft to provide a set number of clock pulses for each revolution of said shaft, resettable counter means driven by said clock pulses and reset by said means to determine providing known counts for revolution of said shaft, means connected to said counter means to provide an initiating signal when desired conditions exist in relation to the phase angle of said shaft and the output power from the SCR's being controlled, logic circuit means responsive to the initiating signal for providing logical level signals in a desired SCR firing sequence, said logic circuit means including shift register means connected to said counter means.

5. The combination as specified in claim 4 and means to provide a control signal, said means to provide an initiating signal includes a comparator comparing said control signal with a second signal and providing a logical level initiating signal when the compared signals are at a desired relationship.

6. A controller for providing output signals referenced to a phase angle of a periodic input signal generated from a rotating element, including digital tachometer means coupled to said rotating element to provide a known number of electrical pulses for each revolution of said rotating element, first means providing a first signal during a cycle of the input signal when the input signal is sensed to be at a desired phase angle, digital counter means including reset means responsive to the first signal and being connected to the digital tachometer to deliver a plurality of output signals digitally referenced to the phase of the rotating element and the input signal.

7. The controller of claim 6 wherein said digital tachometer means comprises a disc member driven by said rotating element and having a plurality of slots therethrough and an optical coupler sensing passage of said slots as said disc rotates with said rotating element and providing an output electrical pulse as it senses each slot.

* * * * *